(12) United States Patent
Dumler et al.

(10) Patent No.: US 10,889,213 B2
(45) Date of Patent: Jan. 12, 2021

(54) CLIP AND METHOD FOR ATTACHING AND TENSIONING SEAT DRESS COVERS

(71) Applicant: B/E Aerospace Fischer GmbH, Landshut (DE)

(72) Inventors: Arthur Dumler, Landshut (DE); Andreas R. Glöckner, Furth (DE)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/561,297

(22) Filed: Sep. 5, 2019

(65) Prior Publication Data
US 2019/0389348 A1 Dec. 26, 2019

Related U.S. Application Data

(63) Continuation of application No. 15/808,187, filed on Nov. 9, 2017, now Pat. No. 10,442,329.

(51) Int. Cl.
| | |
|---|---|
| *B60N 2/60* | (2006.01) |
| *F16B 2/22* | (2006.01) |
| *F16B 5/06* | (2006.01) |
| *F16B 2/24* | (2006.01) |
| *B64D 11/06* | (2006.01) |

(52) U.S. Cl.
CPC ......... *B60N 2/6027* (2013.01); *B60N 2/6045* (2013.01); *F16B 2/22* (2013.01); *F16B 2/245* (2013.01); *F16B 5/0692* (2013.01); *B64D 11/06* (2013.01); *Y10T 24/304* (2015.01); *Y10T 24/306* (2015.01); *Y10T 24/307* (2015.01); *Y10T 24/309* (2015.01); *Y10T 24/44274* (2015.01); *Y10T 24/45105* (2015.01)

(58) Field of Classification Search
CPC ... Y10T 24/304; Y10T 24/306; Y10T 24/307; Y10T 24/45105
See application file for complete search history.

(56) References Cited

U.S. PATENT DOCUMENTS

| | | | | |
|---|---|---|---|---|
| 3,977,048 A | * | 8/1976 | Benedetti | F16B 5/121 24/293 |
| 4,192,441 A | * | 3/1980 | Batts | A47G 25/485 223/96 |
| 4,249,529 A | * | 2/1981 | Nestor | A61M 16/0488 128/207.17 |
| 5,178,306 A | * | 1/1993 | Petrou | A47G 25/485 223/91 |
| 5,285,556 A | * | 2/1994 | Shorin | A61B 17/122 24/487 |
| 5,347,690 A | * | 9/1994 | Mansoor | B60R 19/52 24/294 |

(Continued)

*Primary Examiner* — David E Allred
(74) *Attorney, Agent, or Firm* — Suiter Swantz pc llo

(57) ABSTRACT

A seat dress cover attachment clip, dress cover attachment system, and method for attaching and tensioning a seat dress cover. The attachment clip includes a clamp portion adapted to clamp to a rigid seat part and a portion attachable to a seat dress cover. The clamp includes a flexible part for accommodating different rigid part thickness and the portion attachable to the seat dress cover, in use, tensions the seat dress cover wrapped around the clip. Elongate clips can be utilized to attached to dress cover to a rigid seat part, such as a backrest or other seat element.

18 Claims, 10 Drawing Sheets

(56) References Cited

U.S. PATENT DOCUMENTS

| | | | | |
|---|---|---|---|---|
| 5,376,423 | A * | 12/1994 | Wiegand | F16B 7/0426 24/289 |
| 5,513,934 | A * | 5/1996 | German | B60R 13/01 24/297 |
| 5,581,854 | A * | 12/1996 | Swain | A44B 19/16 24/400 |
| 5,788,315 | A * | 8/1998 | Tucker | B60J 7/102 160/395 |
| 6,327,758 | B1 * | 12/2001 | Petrakis | E04B 9/006 24/293 |
| 2003/0079319 | A1 * | 5/2003 | McAllister | B65F 1/06 24/536 |
| 2003/0213105 | A1 * | 11/2003 | Bednarski | B60N 2/5825 24/289 |
| 2008/0028577 | A1 * | 2/2008 | Soman | F16B 21/075 24/293 |
| 2010/0001164 | A1 * | 1/2010 | Wear | G09F 15/0018 248/475.1 |
| 2012/0159749 | A1 * | 6/2012 | Itou | H02G 3/26 24/457 |
| 2012/0181814 | A1 * | 7/2012 | Fournier | F16B 2/245 296/136.1 |
| 2013/0009020 | A1 * | 1/2013 | Shirakabe | F16L 55/035 248/74.1 |
| 2013/0326846 | A1 * | 12/2013 | Cullen | E04D 13/068 24/564 |
| 2014/0157557 | A1 * | 6/2014 | Diep | F16B 9/023 24/519 |
| 2014/0237777 | A1 * | 8/2014 | Braggion | F16B 2/22 24/297 |
| 2015/0342330 | A1 * | 12/2015 | Tom | B63H 16/04 24/3.1 |
| 2016/0174719 | A1 * | 6/2016 | Saiga | B60N 2/58 24/531 |
| 2016/0372012 | A1 * | 12/2016 | Norman | G09F 3/204 |
| 2017/0202292 | A1 * | 7/2017 | Volmer | A45F 5/02 |

\* cited by examiner

CLIP AND METHOD FOR ATTACHING AND TENSIONING SEAT DRESS COVERS

RELATED APPLICATION AND INCORPORATION BY REFERENCE

This continuation application claims priority from U.S. application Ser. No. 15/808,187 filed Nov. 9, 2017, the entirety of which is incorporated by reference herein.

BACKGROUND

Passengers seats, such as aircraft passenger seats, commonly include rigid seat parts, contoured foam cushions, and dress covers. Conventional apparatus and methods for attaching dress covers over foam cushions include adhesive bonding, tie-downs, hog rings, and hook-and-loop fasteners.

Adhesives are undesirable because adhesive bonds tend to break down over time as a result of cushion flexing. Adhesive bonding further prevents the dress cover and cushion from being separated without damaging the cushion, thus requiring cushion replacement at the time of dress cover replacement.

Tie downs and hog rings are undesirable because both require a special tool for installation, thus increasing time and complexity during initial installation and subsequent dress cover replacement. Further, tie downs and hog rings tend to cause unevenness in the surface contour as the dress cover tends to be pulled tight at each tie down or hog ring location and remain loose between tie down or hog ring locations. Further, tie downs and hog rings are damaged during disassembly, thus requiring new tie downs or hog rings with dress cover replacement.

Hook-and-loop fasteners are undesirable because such fasteners tend to have low tension strength, particularly when pulling the two sections apart perpendicular to the joined plane. Further, each of the two sections must be attached to one of the dress cover, rigid seat part, and cushion, thus requiring sewing or adhesive bonding.

In view of the above disadvantages, what is needed are dress cover attachment solutions able to accommodate various rigid attachment structures, assemble and disassemble without damage to the cushion and attachment structure, and facilitate rapid dress cover attachment and replacement, among other advantages.

SUMMARY

In one aspect, embodiments of the inventive concepts disclosed herein are directed to a dress cover attachment system including a dress cover having a fabric conduit, a rod disposed in the fabric conduit, and a dress cover clip secured around the rod at a location of a break in the fabric conduit, the dress cover clip including a rod holder adapted to engage along a length of the rod, and a clamp adapted to receive a rigid seat part therein, the clamp including a first part and a second part spring-biased in a direction of the first part.

In a further aspect, the rod holder may be disposed adjacent an attached end of the first part.

In a further aspect, the first part may be interconnected to the second part through the rod holder and a sidewall oriented perpendicular to the first part.

In a further aspect, the dress cover clip may be sequentially continuous from the first part to the rod holder to the sidewall to the second part.

In a further aspect, an inner surface of the sidewall may directly contact an edge of the rigid seat part when the rigid seat part is fully engaged in the slot.

In a further aspect, the second part may include a lip arranged along a free end of the second part, a claw disposed inward of the lip in a direction of an attached end of the second part, the claw oriented facing the first part, and a flat plate disposed inward of the claw in the direction of the attached end of the second part.

In a further aspect, the fabric conduit may be disposed along an edge of the dress cover.

In another aspect, embodiments of the inventive concepts disclosed herein are directed to a dress cover clip including a rod holder adapted to engage along a length of a rod exposed through a break in a fabric conduit of a dress cover, a first part continuous with and extending from the rod holder, a sidewall continuous with an extending from the rod holder, the sidewall oriented perpendicular to the first part, and a second part continuous with and extending from the sidewall, the second part extending in a direction of the first part and spaced apart from the first part such that a slot is provided between the first part and the second part adapted to receive a rigid seat part therein, the second part spring-biased in a direction of the first part.

In a further aspect, the dress cover clip may be sequentially continuous from the first part to the rod holder to the sidewall to the second part.

In a further aspect, the second part may include a lip arranged along a free end of the second part, a claw disposed inward of the lip in a direction of an attached end of the second part, the claw oriented facing the first part, and a flat plate disposed inward of the claw in the direction of the attached end of the second part.

In a further aspect, the dress cover clip may be a unitary piece of metal stamped and bent to form the first part, the rod holder, the sidewall, and the second part.

In another aspect, embodiments of the inventive concepts disclosed herein are directed to a dress cover attachment clip including a clamp adapted to receive a rigid seat part therein, the clamp including a first part adapted to seat flush against a face of the rigid seat part, a second part perpendicular to the first part and adapted to directly contact an edge of the rigid seat part, a third part parallel to the first part, and a flexible part extending inward from the third part and spring-biased in a direction of the first part, wherein the rigid seat part is compressed between the first part and the flexible part when the rigid seat part is fully engaged in the clamp, a free end adapted to be attached to a dress cover, and a integral hinge interconnecting the clamp and the free end.

In a further aspect, the free end may be sewn to the dress cover, and the dress cover may be folded over an outer surface of the second part followed by an outer surface of the first part after the rigid seat part is fully engaged in the clamp.

In a further aspect, the dress cover attachment clip may be a plastic extrusion.

In a further aspect, the integral hinge, when the free end is folded over in a direction of an outer surface of the third part, may spring-bias the free end apart from the third part to impart tension in the dress cover wrapped around the dress cover attachment clip.

In a further aspect, a free end of the flexible part may extend in a direction of a connection point of the first and second parts.

In a further aspect, the dress cover attachment clip may be continuous from the first part to the second part to the third part to the integral hinge to the free end.

In another aspect, embodiments of the inventive concepts disclosed herein are directed to a method for attaching and tensioning a seat dress cover including providing a dress cover attachment clip having a clamp configured to hold a rigid seat part therein, the clamp provided between spaced first and second parts, the second part spring-biased in a direction of the first part such that the rigid seat part is held between the first and second parts when the rigid seat part is fully engaged in the clamp, securing a dress cover to the dress cover attachment clip, and clamping the dress cover attachment clip to a rigid seat part.

In a further aspect, the dress cover may be sewn to a free end of the dress cover attachment clip.

In a further aspect, the dress cover may be secured to the dress cover attachment clip through a rod held in the dress cover attachment clip, the rod disposed in a fabric conduit of the dress cover.

Embodiments of the invention can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

The inventive concepts disclosed herein are generally directed to facilitating rapid dress cover installation and replacement, as well as improved aesthetics associated with dress cover attachment and tensioning. The dress cover clips, dress cover attachment systems, and methods for attaching dress covers discussed herein are applicable to aircraft seats, as well as other seat types requiring dress cover attachment over a cushion and/or rigid seat part.

Figure 1:
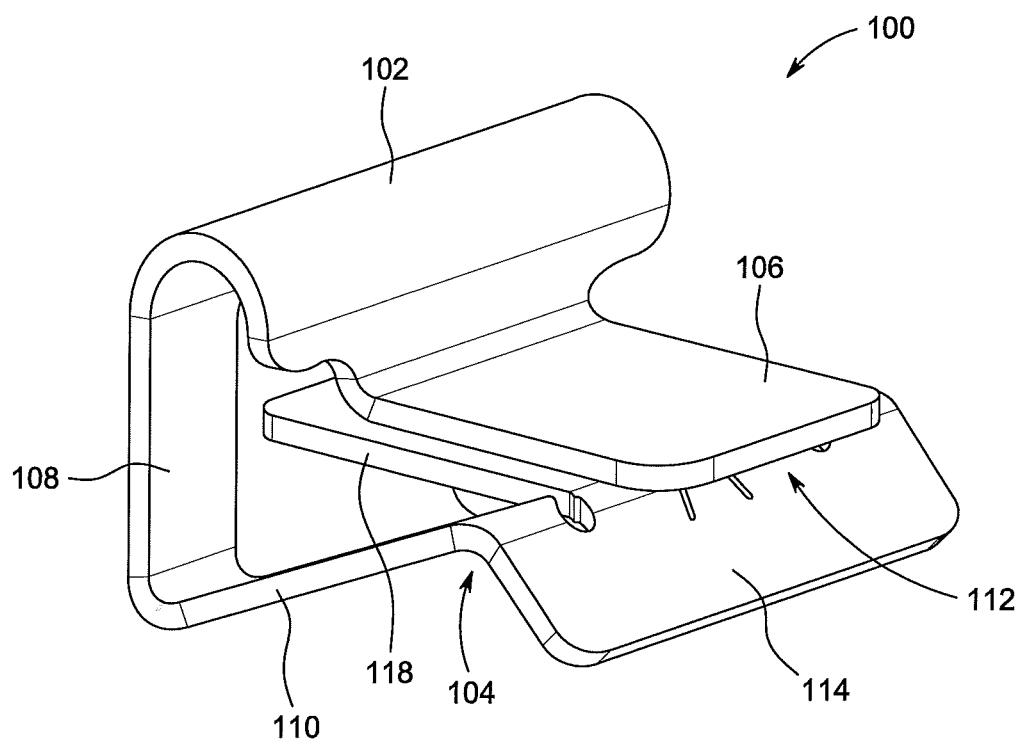
FIG. 1 is an isometric view of a dress cover clip according to a first embodiment of the invention.

In an exemplary embodiment, FIG. 1 illustrates a dress cover clip 100 for dress cover attachment and tensioning. The dress cover clip 100 generally includes a rod holder 102 adapted to engage along a length of a rod exposed through a break in a fabric conduit of a dress cover, and a clamp 104 adapted to receive and retain therein a rigid seat part. The rigid seat part can include, but is not limited to, an edge of a seat pan or seat back, a rigid frame member, and a seat bucket edge. In use, the dress cover clip 100 captures the rod therein and secures to the rigid seat part.

The clamp 104 generally includes a first part 106 continuous with and extending from the rod holder 102, a sidewall 108 continuous with an extending from an opposing side of the rod holder 102, and a second part 110 continuous with and extending from the sidewall 108. The second part 110 extends at an angle generally in a direction of the first part 106 and is spaced apart from the first part 106 such that a slot 112 is provided between the first part 106 and the second part 110 adapted to receive a rigid seat part therein. The second part 110 is spring-biased in a direction of the first part 106 such a rigid seat part fully engaged in the clamp 104 is compressed between the first part 106 and the second part 110.

The sidewall 108 is oriented perpendicular to the first part 106 and is interconnected to the first part 106 through the intermediate rod holder 102. The rod holder 102 is disposed "above" a plane of the first part 106 as viewed in FIG. 1, such that a rod captured in the rod holder 102 is disposed inward of the first part 106, thereby preventing the rod from exiting the rod holder 102 in a direction of the first part. The position of the rod holder 102 relative to the first part 106 further allows the dress cover to seat atop an outer face of the first part 106, thereby concealing the first part 106 from view when the dress cover clip 100 is fully installed on the rigid seat part.

The second part 110 of the clamp 104 generally includes a lip 114 disposed along the free end of the second part 110, a claw 116 (see FIG. 2) disposed inward of the lip 114 in a direction of the attached end of the second part 110, and a flat plate 118 disposed inward of the claw 116 in the direction of the attached end of the second part 110. The term "claw" as used herein includes any feature, coating, component, etc. for increasing friction and/or engaging with a surface of the rigid part fully installed in the clamp 104. For example, the claw 116 can be a toothed feature that engages with the roughness of the surface of the rigid part to prevent the dress cover clip 100 from being pulled apart from the rigid seat part in a direction perpendicular to the sidewall 108. The lip 114 is sloped to guide the rigid seat part into the slot 112, and additionally serves as a grabbable feature to pull the second part 110 out of engagement with the rigid seat part to remove the dress cover clip 100 from the rigid seat part.

The dress cover clip 100 is sequentially continuous from the first part 106 to the rod holder 102 to the sidewall 108 to the second part 110. The dress cover clip 100 can be a unitary piece of metal stamped and bent to form the first part 106, the rod holder 102, the sidewall 108, and the second part 110. Suitable examples of metals include, but are not limited to, stainless spring steel and titanium.

Figure 2:
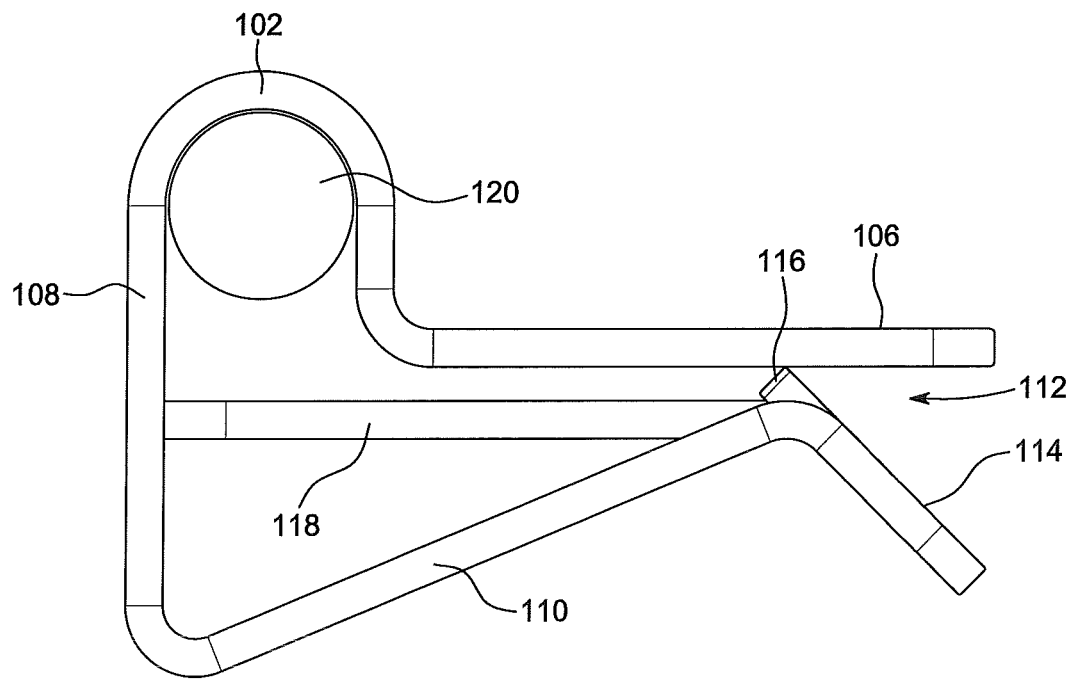
FIG. 2 is an end view of the dress cover clip of FIG. 1.

Referring to FIG. 2, the dress cover clip 100 is shown installed around a rod 120 and ready to be installed on a rigid seat part. The claw 116 is shown facing inward in a direction of the first part 106, ready to engage a face of the rigid seat part. The slot 112 is open and accessible, and the first part 106 is parallel and spaced from the flat plate 118.

Figure 3:
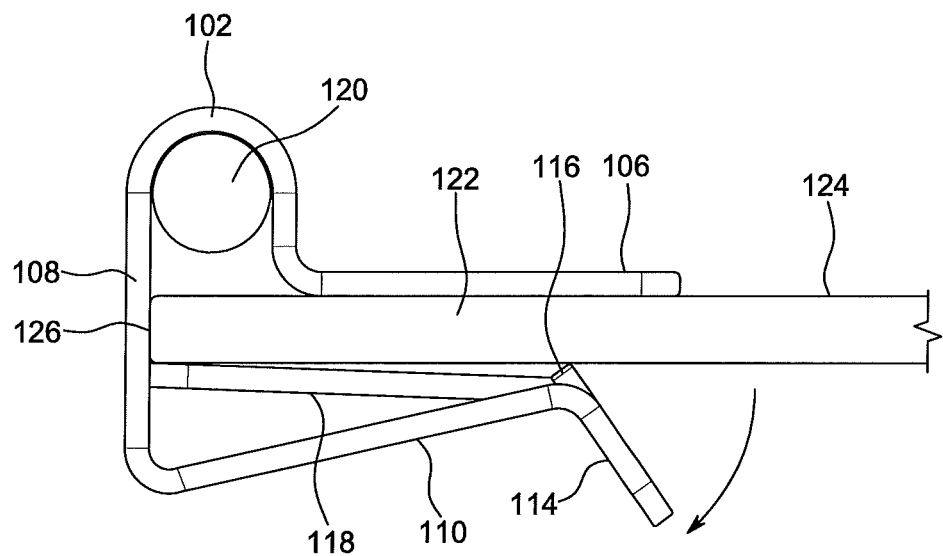
FIG. 3 is an end view of the dress cover clip of FIG. 1 shown installed on a seat pan having a first thickness.
Figure 4:
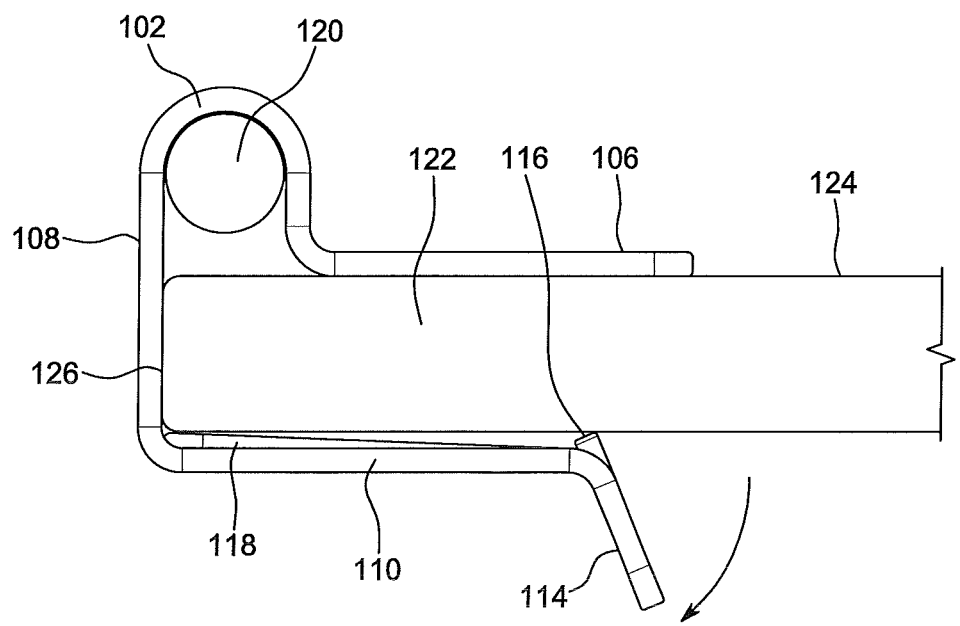
FIG. 4 is an end view of the dress cover clip of FIG. 1 shown installed on a seat pan having a second thickness.

FIGS. 3 and 4 show different thicknesses of rigid seat parts 122 fully installed in the clamp portion of the dress cover clip 100. The rigid seat part 122 shown in FIG. 3 has a first thickness, while the rigid seat part 122 shown in FIG. 4 has a second thickness greater than the first thickness. Both rigid seat parts 122 have a square edge profile such that, when the rigid seat part 122 is fully seated in the clamp, an inner surface of the first part 106 is parallel with and flush against a "top" surface 124 of the rigid seat part 122, and the edge 126 of the rigid seat part 122 is flush against an inner surface of the sidewall 108. The flat plate 118 and the claw 116 each engage a "bottom" surface of the rigid seat part 122 such that two points of contact on the "bottom" surface are maintained regardless of the thickness of the rigid seat part 122. Depending on the thickness of the rigid seat part 122, the second part 110 deflects "downward" away from the first part 106 as indicated by the directional arrow.

Figure 5:
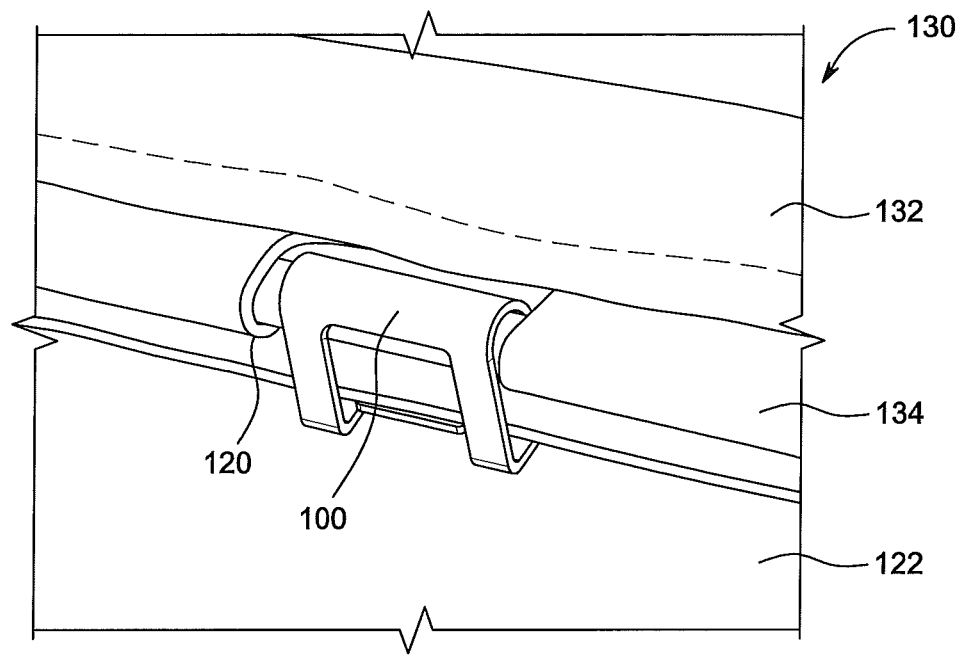
FIG. 5 is a top perspective view showing the dress cover clip of FIG. 1 installed on a seat bottom.
Figure 6:
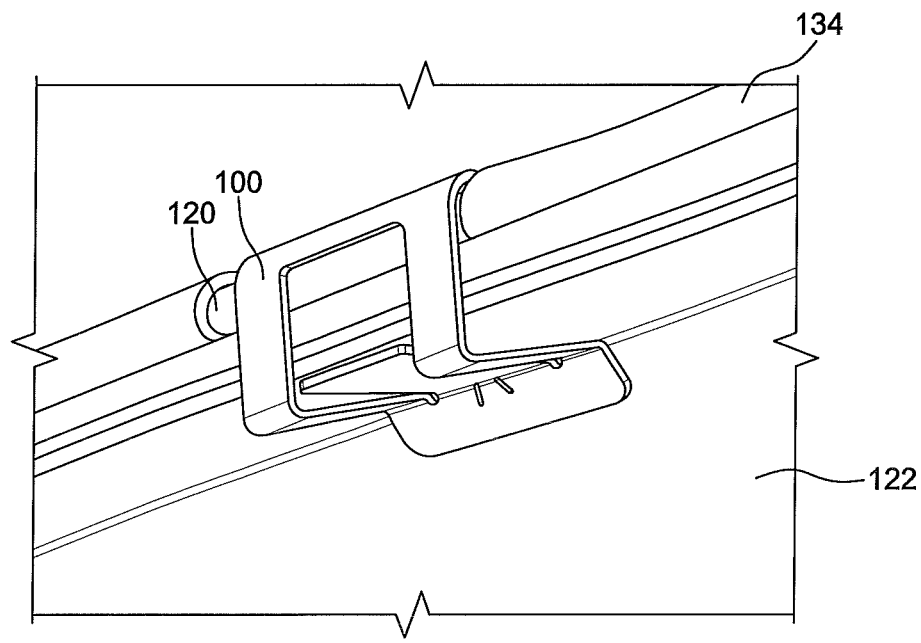
FIG. 6 is a bottom perspective view showing the dress cover clip of FIG. 1 installed on a seat bottom.
Figure 7:
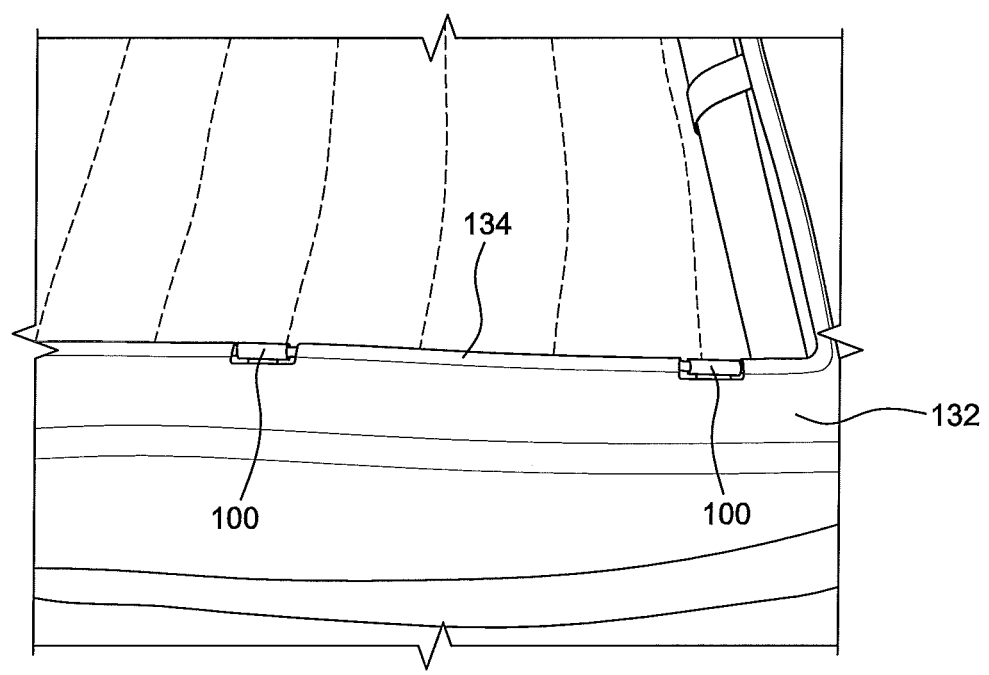
FIG. 7 is a bottom view of a seat bottom showing the use of multiple dress cover clips of FIG. 1 attaching a dress cover.

FIGS. 5-7 show a dress cover attachment system 130 generally including a dress cover 132 having a fabric conduit 134, a rod 120 disposed in the fabric conduit 134, and the dress cover clip 100 discussed above. The fabric conduit 134 can be disposed along an edge of the dress cover 132 or inward of the edge, for example, along the bottom surface of the dress cover 132 to provide an overhanging dress cover to fully conceal the view of the underlying dress cover clip(s) 100 from above. The rod 120 is exposed at a break along the length of the fabric conduit 134. A single dress cover clip 100 is attached at each exposed rod location. The rod 120 is first captured in the rod holder portion of the dress cover clip 100, and subsequently the dress cover clip 100 is fixed to the rigid seat part 122.

Each dress cover 132 can include one or more fabric conduits 134 each configured to hold one or more rods 120. In an exemplary application, a dress cover for a seat pan can include three rods each secured using 2-3 dress cover clips 100 per side spaced apart about 10-13 cm (about 4-5 inches). Rigid seat part materials can include, but are not limited to aramid or carbon fiber (as shown), and soft metals such as aluminum. The dress cover clip 122 can be connected and disconnected to the dress cover rod 120 without disassembling the rod 120 from the dress cover and without any damage to the dress cover clip 100 or the periphery thereof.

Figure 8:
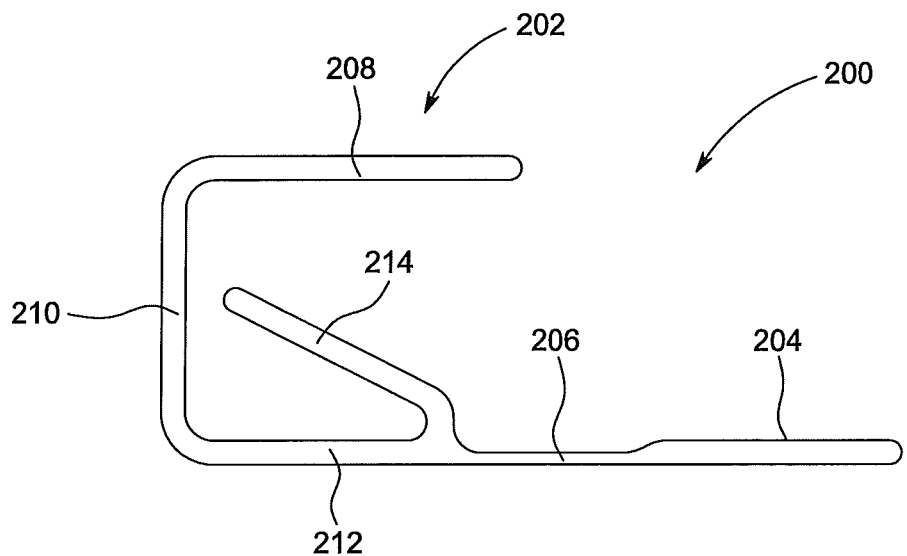
FIG. 8 is an end view of a dress cover clip according to a second embodiment of the invention.
Figure 9:
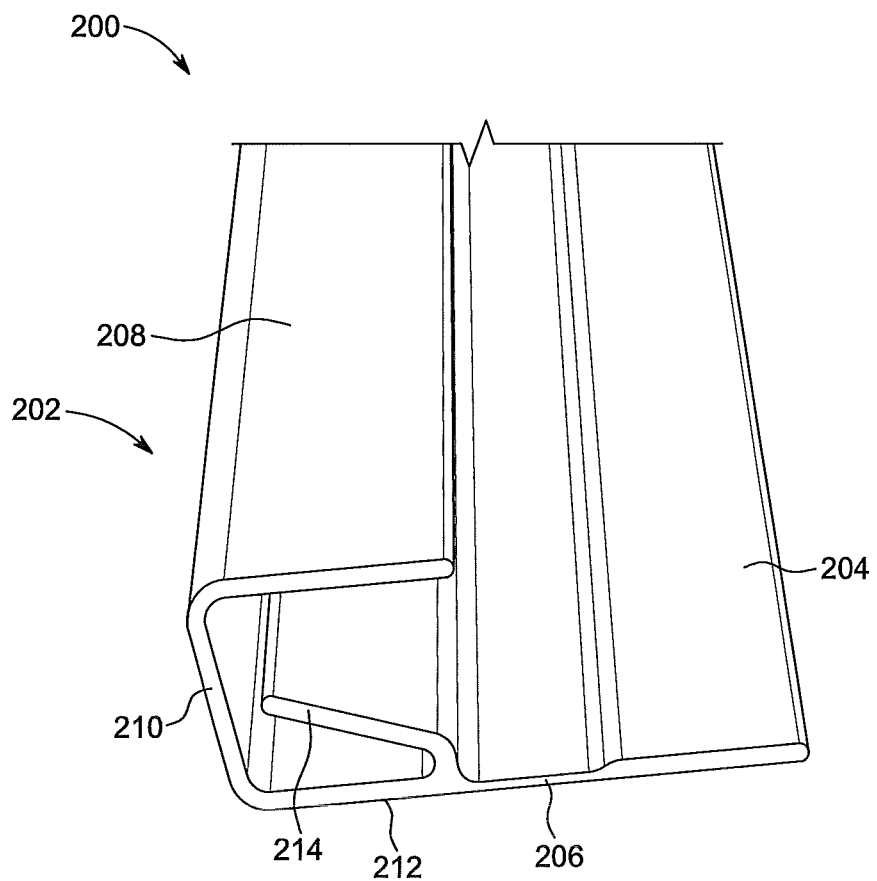
FIG. 9 is a perspective view of the dress cover clip of FIG. 8 shown as an extrusion made from plastic.

In another exemplary embodiment, FIGS. 8 and 9 illustrates a dress cover clip 200 for dress cover attachment and tensioning. The dress cover clip 200 generally includes a clamp 202 adapted to receive a rigid seat part therein, a free end 204 adapted to be attached to the dress cover, and an integral hinge 206 interconnecting the clamp 202 and the free end 204. The clamp 202 generally includes a first part 208 adapted to seat flush against a face of the rigid seat part, a second part 210 perpendicular to the first part 208 and adapted to directly contact an edge of the rigid seat part, a third part 212 parallel to the first part, and a flexible part 214 hinged to the third part 212 and extending inward and spring-biased in a direction of the first part 208. The rigid seat part is held between the first part 208 and the flexible part 214 when the rigid seat part is fully engaged in the clamp 202.

The dress cover clip 200 can be a flexible plastic extrusion having any length such that the dress cover clip 200 is unitary and continuous from the first part 208 to the second part 210 to the third part 212 to the integral hinge 206 to the free end 204, also including the flexible part 214. The dress cover clip 200 can be flexible to follow the curvature of a rigid seat part.

Figure 10:
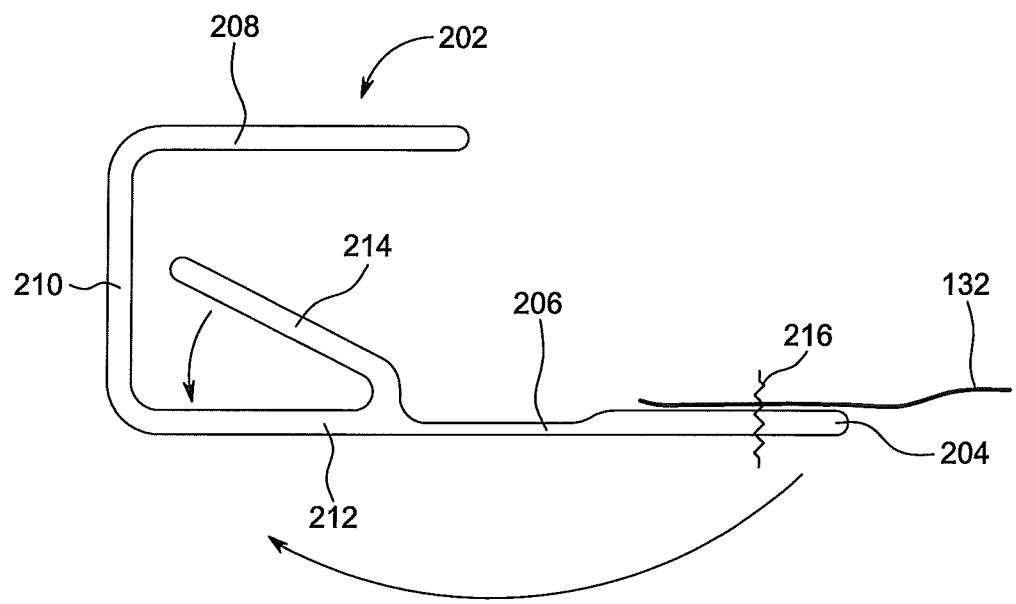
FIG. 10 is a schematic illustration showing dress cover attachment to the dress cover clip of FIG. 8.

Referring to FIG. 10, a free end of the flexible part 214 extends in a direction of the joint/connection part between the first part 208 and the second part 210 such that the free end deflects "downward" in the direction of the third part 212 when the dress cover clip 200 is attached to the rigid seat part, thereby holding the rigid seat part between the first part 208 and the deflected flexible part 214. The clamp 202 of dress cover clip 200 has a square profile to "match" the square profile of the rigid seat part, at least concerning the first and second parts 208, 210 seating flush against the respective "top" and "edge" of the rigid seat part. Other clip shapes and profiles are envisioned, including but not limited to, curved, arcuate, triangular and combinations thereof.

Figure 11:
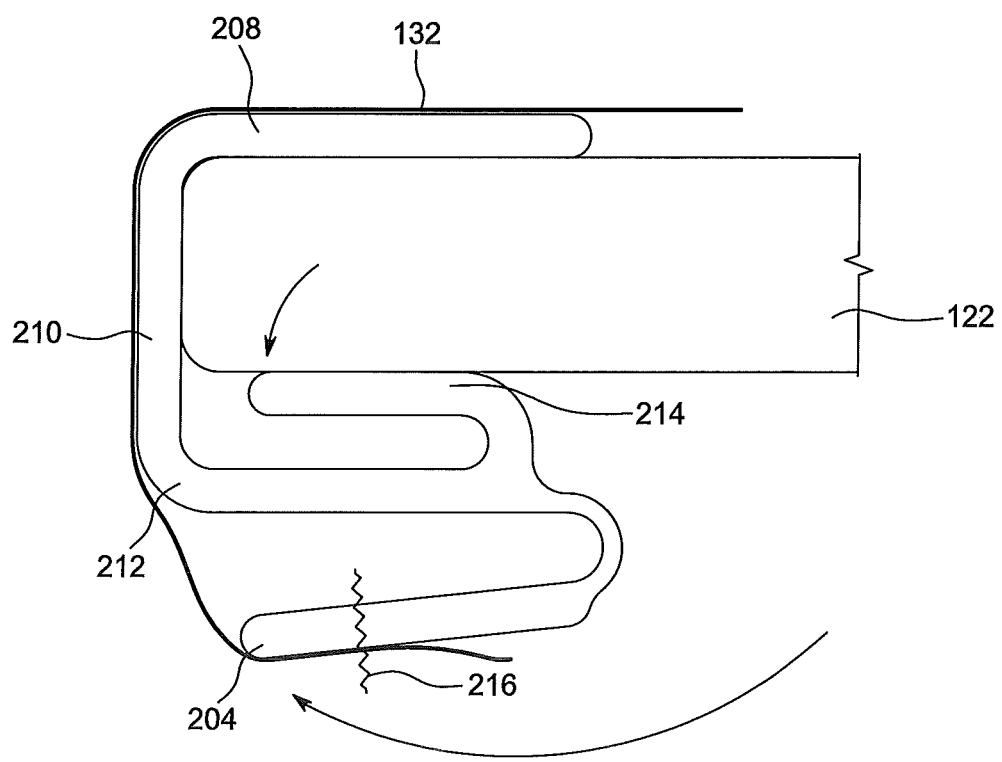
FIG. 11 is a schematic illustration showing dress cover folding around the dress cover clip of FIG. 8.

The free end 204 of the dress cover clip 200 is adapted to be sewn or otherwise attached to the dress cover 132. As shown in FIG. 10, prior to attaching the dress cover clip 200 to the rigid seat part, the dress cover 132 is sewn or otherwise attached to the clamp-side face of the free end 204, indicated at reference numeral 216. Subsequently, the dress cover is wrapped about the dress cover clip 200 as discussed below, and the dress cover clip 200 attached along the edge of the rigid seat part 122. In the fully assembled state as shown in FIG. 11, the dress cover fabric is pulled tightly around the outer surface of the dress cover clip 200 such that the free end 204 folds outwardly about the integral hinge 206 in a direction of the outer surface of the third part 212 and the dress cover is pulled tightly against the outer surface of the second part 210 and the outer surface of the first part 208.

Figure 12A:
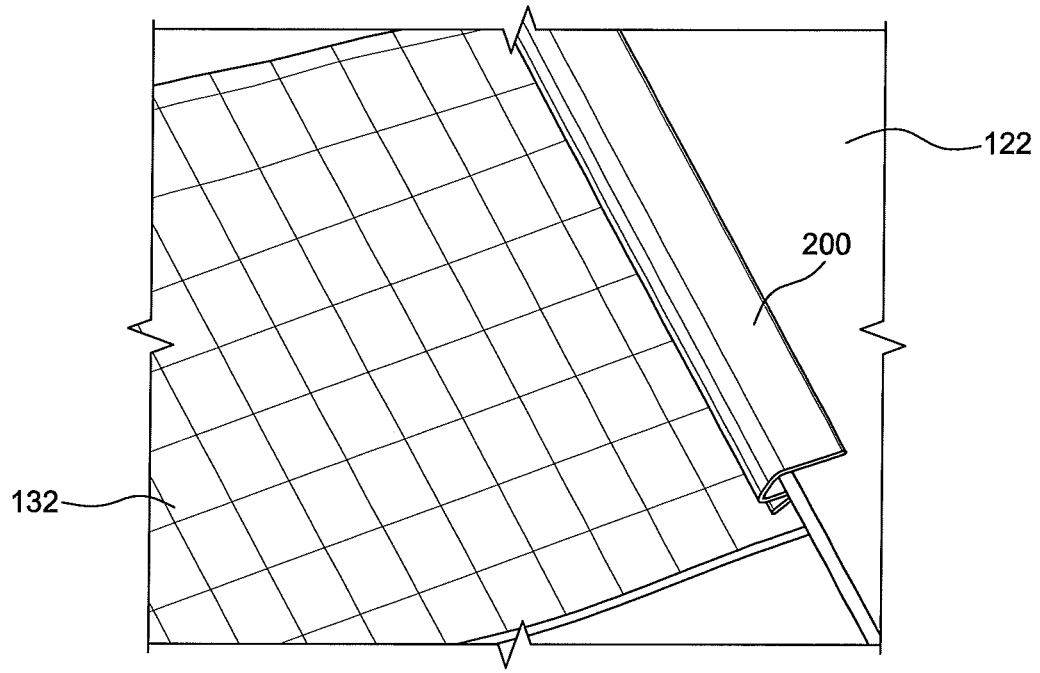
FIGS. 12A-D are sequential illustrations showing dress cover attachment to a seat pan utilizing the dress cover clip of FIG. 8.
Figure 12B:
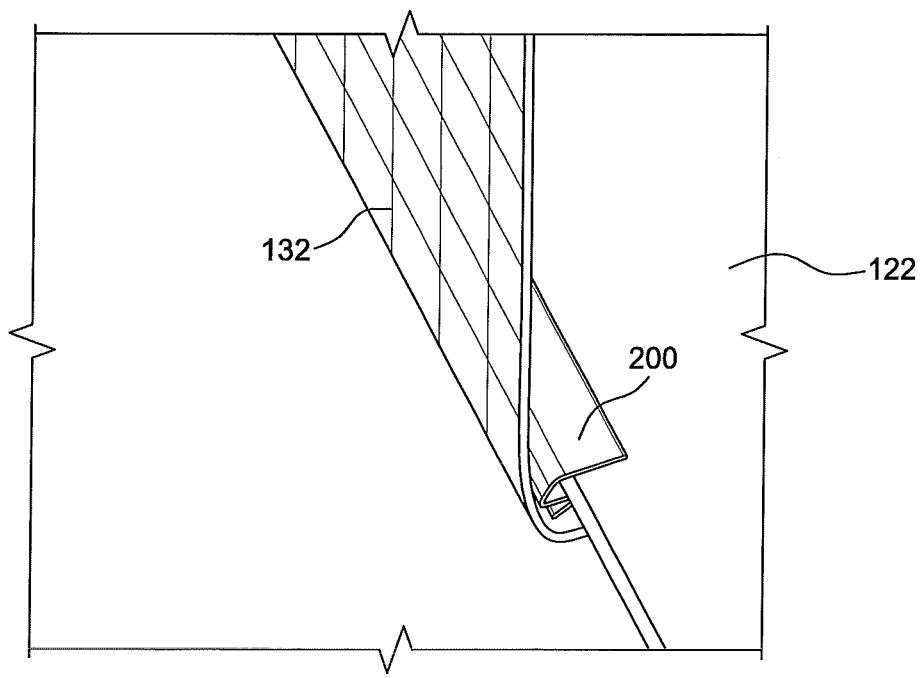
Figure 12C:
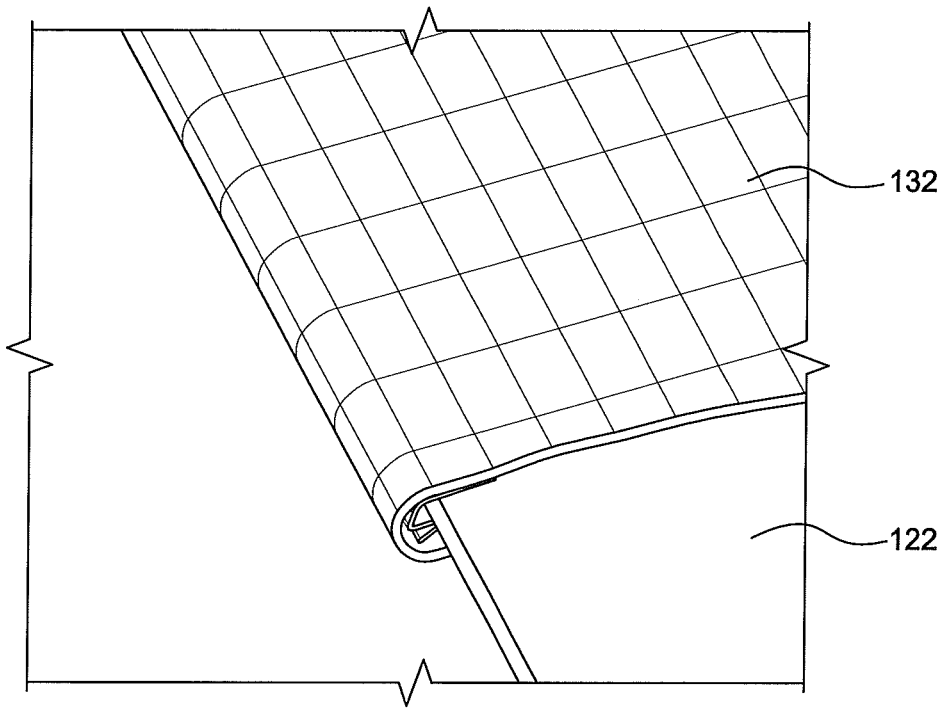
Figure 12D:
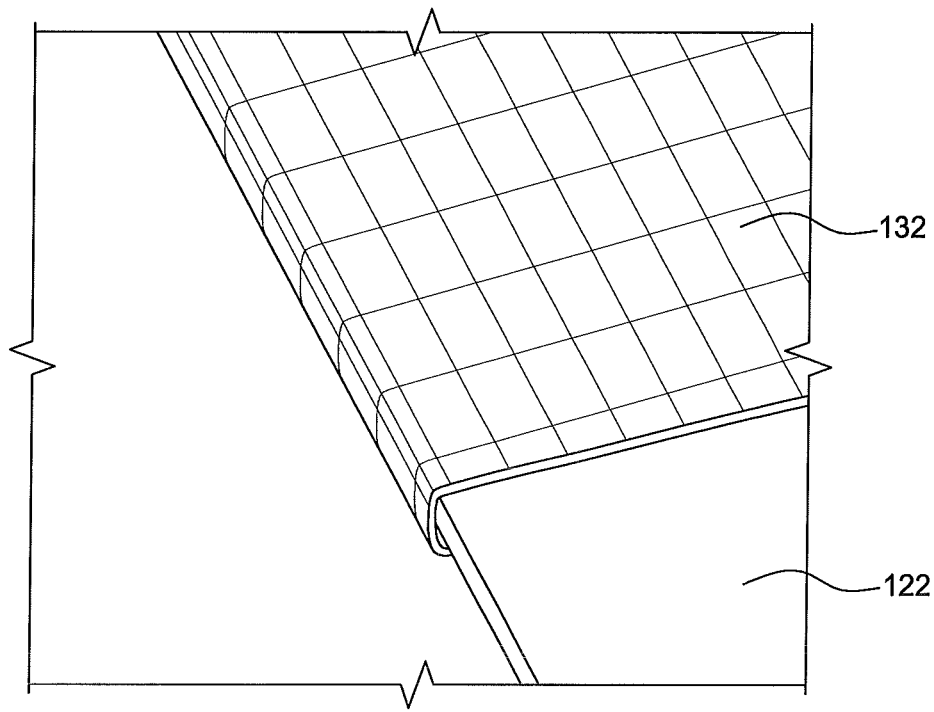

FIGS. 12A-D show sequentially the steps for assembling the dress cover clip 200 on a rigid seat part 122, for example, a seat pan. As shown in FIG. 12A, the dress cover clip 200, having the dress cover 132 attached thereto, is installed along the edge of the rigid seat part 122 such that the rigid seat part is held between the first part 208 and the deflected flexible part 214. The dress cover 132 is then pulled tightly in a direction away from the edge of the rigid seat part such that the free end 204 holds about the integral hinge 206 in a direction of the third part 212. As shown in FIG. 12B, the dress cover 132 is then folded around the dress cover clip 200 thereby covering the outer surface of the second part 210. As shown in FIG. 12C, the dress cover 132 is then folded around the outer surface of the first part 208, thereby concealing the entirety of the dress cover clip 200 beneath the dress cover 132. Finally, as shown in FIG. 12D, opposing sides of the dress cover 132 can be attached to the rigid seat part 122, and the return force in the deflected free end 204 holds the installed dress cover 132 in tension over the rigid seat part 122 and with a low profile width.

Figure 13:
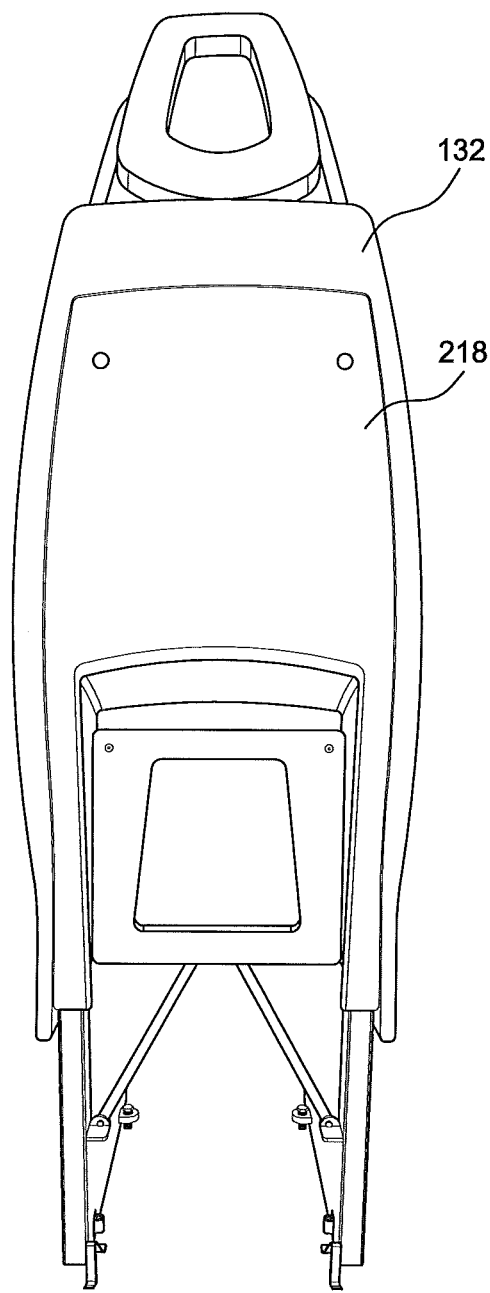
FIG. 13 is a rear elevation view of an exemplary seat utilizing the dress cover clip of FIG. 8 for dress cover attachment.
Figure 14:
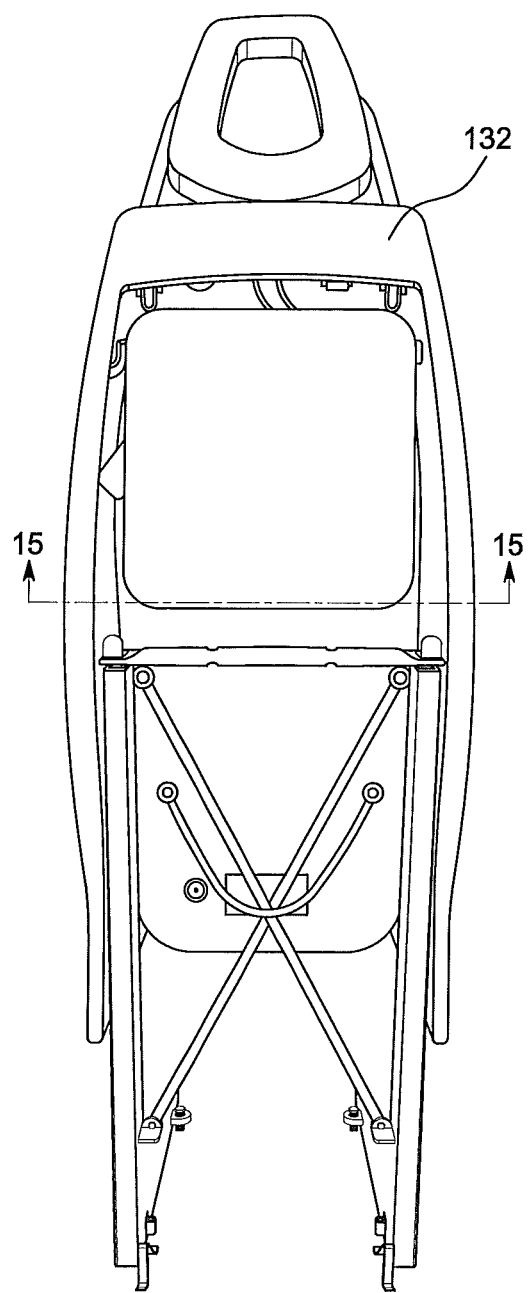
FIG. 14 shows the seat of FIG. 13 with the backrest cover removed.
Figure 15:
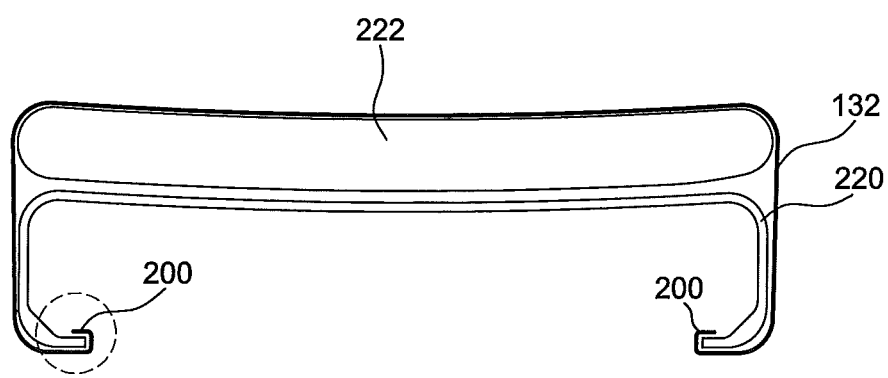
FIG. 15 is a sectional view through the seatback taken along line 15-15 of FIG. 14.

FIGS. 13 and 14 illustrate dress cover 132 attachment to the seat shell using a plurality of dress cover clip 200. FIG. 13 shows the backrest cover 218 installed, while FIG. 14 shows the backrest cover removed. The dress cover can be attached along the top and left and right edges of the seat shell. As seen in FIGS. 13 and 14, the dress cover clips are concealed from view. FIG. 15 is a sectional view through the seatback showing the use of two dress cover clips 200 for attaching the dress cover 132 to the seat shell 220 over a seatback cushion 222.

In a further exemplary embodiment, a method for attaching and tensioning a seat dress cover includes providing a dress cover attachment clip having a clamp configured to hold a rigid seat part therein, securing a dress cover to the dress cover attachment clip, and attaching the dress cover attachment clip to a rigid seat part. The dress cover can be attached to the dress cover clip through a rod, or fastened directly to the dress cover clip.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A dress cover attachment clip, comprising:
   a clamp adapted to receive a rigid seat part therein, the clamp comprising:
   i. a first part;
   ii. a second part continuous with and perpendicular to the first part;
   iii. a third part continuous with and perpendicular to the second part the third part parallel with and spaced apart from the first part; and
   iv. a flexible part hinged at one end to an end of the third part opposite the second part, the flexible part positioned on an inside of the clamp and having a free end extending in a direction toward the second part, the flexible part biased in a direction of the first part, wherein in use the rigid seat part is adapted to be held between the first part and the flexible part when the rigid seat part is engaged in the clamp;
   a fourth part attachable to a seat dress cover; and
   a hinge, separate from a hinged connection of the flexible part to the third part, connecting the fourth part to the third part, the hinge comprising a thinned region that is thinner than each of the third part and the fourth part, the hinge configured to allow the fourth part to be folded over toward the third part outside of the clamp and maintain bias of the fourth part away from the third part, wherein the clamp, the fourth part, and the hinge are formed as one-piece.

2. The dress cover attachment clip of claim 1, wherein the clamp has a square profile.

3. The dress cover attachment clip of claim 1, wherein the fourth part is adapted to be sewn to a seat dress cover, and the seat dress cover is adapted to be folded over an outer surface of the second part followed b an outer surface of the first part outside of the clamp.

4. The dress cover attachment clip of claim 1, wherein the dress cover attachment clip is an integral flexible plastic extrusion.

5. The dress cover attachment clip of claim 1, wherein the hinge, when the fourth part is folded over in a direction of an outer surface of the third part, spring-biases the fourth apart away from the third part to impart tension in the seat dress cover wrapped around the dress cover attachment clip.

6. The dress cover attachment clip of claim 1, wherein the flexible part is positioned between the first part and the third part and is free of attachment to the second part.

7. The dress cover attachment clip of claim 1, wherein the thinned region of the hinge has a thinner sectional profile as compared to sectional profiles of the third part and the fourth part.

8. The dress cover attachment clip of claim 1, wherein the dress cover attachment clip is continuous from the first part to the second part to the third part to the hinge to the fourth part, and wherein the flexible part is attached to the third part proximate the hinge.

9. A seat dress cover attachment system, comprising:
   a rigid seat part;
   a seat dress cover; and
   a dress cover attachment clip, comprising:
   i. a clamp adapted to clamp to the rigid seat part, the clamp comprising a first part adapted to engage a face of the rigid seat part, a second part perpendicular to the first part and adapted to engage an edge of the rigid seat part, a third part parallel to the first part and adapted to engage an opposing face of the rigid seat part, and a flexible part hinged at one end to an end of the third part opposite the second part, the flexible part positioned inside the clamp and extending inward in a direction of the second part and spring-biased in a direction of the first part, wherein the rigid seat part is held between the first part and the flexible part when the rigid seat part is engaged in the clamp;
   ii. a fourth part attached to the seat dress cover; and
   iii. a hinge, separate from a hinged connection of the flexible part to the third part, connecting the fourth part to the third part, the hinge comprising a thinned region that is thinner than each of the third part and the fourth part, the hinge configured to allow the fourth part to be folded over toward the third part outside of the clamp and maintain bias of the fourth part away from the third part, wherein the clamp, the fourth part, and the hinge are formed as one-piece.

10. The seat dress cover attachment system of claim 9, wherein the seat dress cover is sewn to the fourth part, the fourth part is folded to a side of the third part opposite the first part, and the seat dress cover is folded over an outer surface of the second part and an outer surface of the first part.

11. The seat dress cover attachment system of claim 9, wherein the hinge, when the fourth part is folded over in a direction of an outer surface of the third part, spring-biases the fourth part apart from the third part to impart tension in the seat dress cover wrapped around the dress cover attachment clip.

12. The seat dress cover attachment system of claim 9, wherein the clamp has a square profile.

13. The seat dress cover attachment system of claim 9, wherein the dress cover attachment clip is an integral flexible plastic extrusion.

14. The seat dress cover attachment system of claim 9, wherein the flexible part is positioned between the first part and the third part.

15. The seat dress cover attachment system of claim 9, wherein the thinned region of the hinge has a thinner sectional profile as compared to sectional profiles of the third part and the fourth part.

16. The seat dress cover attachment system of claim 9, wherein the dress cover attachment clip is continuous from the first part to the second part to the third part to the hinge to the fourth part, and wherein the flexible part is attached to the third part proximate the hinge.

17. A method for attaching and tensioning a seat dress cover, comprising:
providing a dress cover attachment clip comprising:
i. a clamp adapted to clamp to a rigid seat part, the clamp comprising a first part adapted to engage a face of the rigid seat part, a second part perpendicular to the first part and adapted to engage an edge of the rigid seat part, a third part parallel to the first part and adapted to engage an opposing face of the rigid seat part, and a flexible part hinged at one end to an end of the third part opposite the second part, the flexible part positioned inside the clamp and extending inward in a direction of the second part and spring-biased in a direction of the first part, wherein the rigid seat part is held between the first part and the flexible part when the rigid seat part is engaged in the clamp;
ii. a fourth part attachable to a seat dress cover; and
iii. a hinge, separate from a hinged connection of the flexible part to the third part, connecting the fourth part to the third part, the hinge comprising a thinned region that is thinner than each of the third part and the fourth part, the hinge configured to allow the fourth part to be folded over toward the third part outside of the clamp and maintain bias of the fourth part away from the third part, wherein the clamp, the fourth part, and the hinge are formed as one-piece;
attaching the fourth part to the seat dress cover;
folding the fourth part over to a side of the third part opposite the first part;
folding the seat dress cover over an outer surface of the second part and an outer surface of the first part; and
securing the rigid seat part within the clamp.

18. The method of claim 17, wherein the hinge, when the fourth part is folded over in a direction of an outer surface of the third part, spring-biases the fourth part apart from the third part to impart tension in the seat dress cover wrapped around the dress cover attachment clip.

\* \* \* \* \*